United States Patent [19]
Kautz et al.

[11] 3,872,372
[45] Mar. 18, 1975

[54] DV/DT CIRCUIT FOR USE IN D.C. LINK CONVERTERS

[75] Inventors: Robert F. Kautz, Spring Lake; Leo B. Bourgeault, Wall Township; Robert C. Eckenfelder, Point Pleasant, all of N.J.

[73] Assignee: The Bendix Corporation, Teterboro, N.J.

[22] Filed: Sept. 21, 1973

[21] Appl. No.: 399,656

[52] U.S. Cl. .............................................. 321/45 C
[51] Int. Cl. ............................................ H02m 1/08
[58] Field of Search ....................... 321/45 R, 45 C

[56] References Cited
UNITED STATES PATENTS

| | | | |
|---|---|---|---|
| 3,311,809 | 3/1967 | Corey et al. | 321/45 C |
| 3,328,667 | 6/1967 | Shaneman | 321/45 R |
| 3,365,638 | 1/1968 | Risberg | 321/5 X |
| 3,372,329 | 3/1968 | Steimel et al. | 321/45 R X |
| 3,405,346 | 10/1968 | Krauthamer | 321/45 C |
| 3,470,449 | 9/1969 | Risberg | 321/45 R X |
| 3,487,278 | 12/1969 | Turnbull et al. | 321/45 C |
| 3,609,511 | 9/1971 | Risberg | 321/45 C X |
| 3,675,110 | 7/1972 | Kelley, Jr. | 321/5 X |
| 3,763,418 | 10/1973 | Beck et al. | 321/45 C |

*Primary Examiner*—R. N. Envall, Jr.
*Attorney, Agent, or Firm*—S. H. Hartz; Anthony F. Cuoco

[57] ABSTRACT

A circuit for controlling the rate of change (dv/dt) of forward blocking voltage reapplied across a silicon controlled rectifier to prevent the silicon controlled rectifier from conducting after the silicon controlled rectifier is turned off including an LC network connected to the silicon controlled rectifier.

8 Claims, 1 Drawing Figure

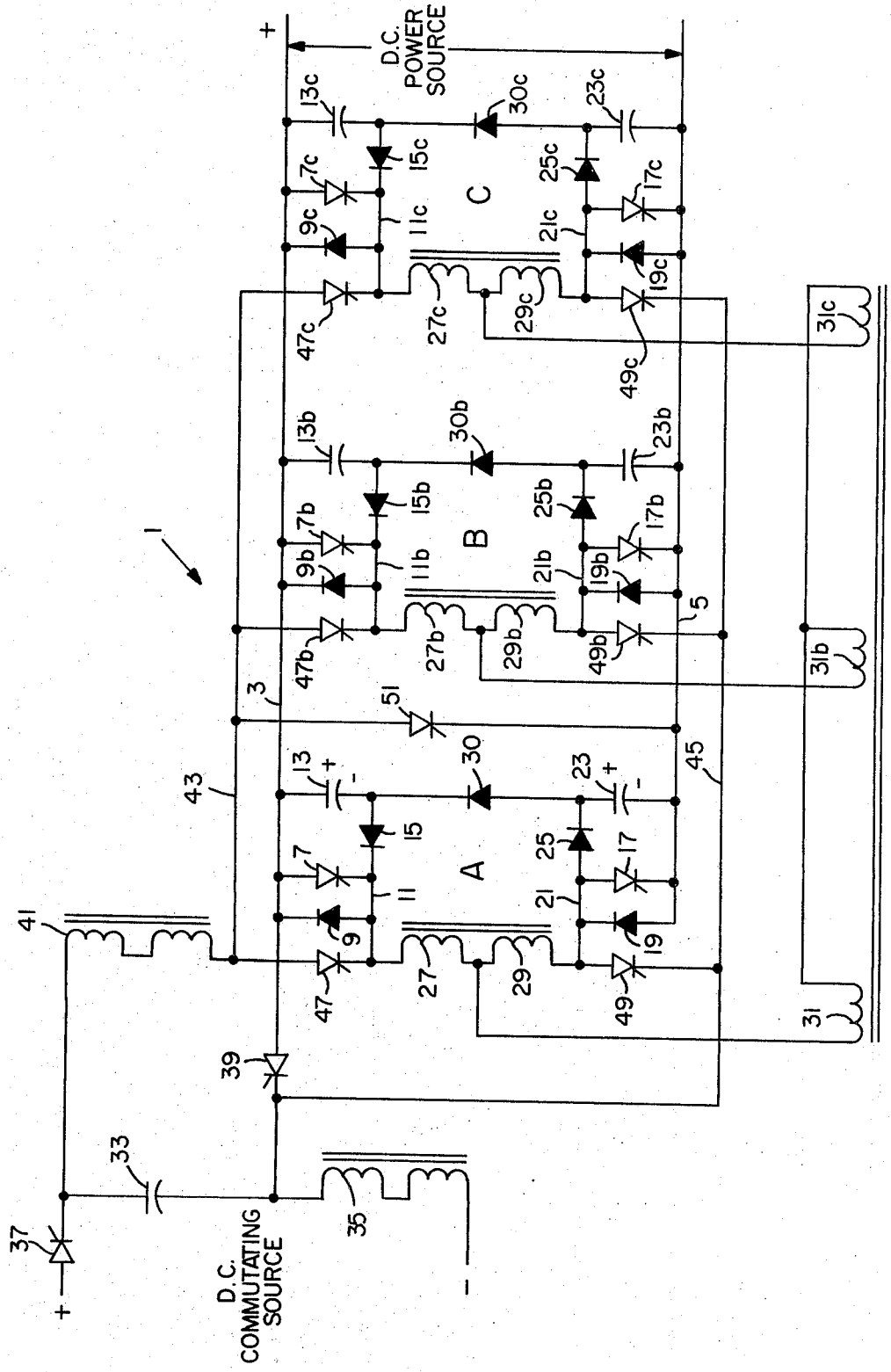

DV/DT CIRCUIT FOR USE IN D.C. LINK CONVERTERS

The invention relates to circuits for controlling switching devices and, more particularly, to circuits for controlling silicon controlled rectifiers.

A high rate of rise of forward (anode to cathode) voltage may cause a silicon controlled rectifier to switch on or into the low impedance forward conducting state in the absence of a gate signal. In the interest of circuit reliability it is therefore important to maintain the rate of rise of forward voltage below that which will cause a silicon controlled rectifier to switch on or into the low impedance forward conducting state. This is referred to by the manufacturers as the "dv/dt withstand capability."

dv/dt withstand capability is considered in two contexts, one is the static dv/dt withstand capability which refers to the initial energization of the circuit or operation of the silicon controlled rectifier from an anode voltage source which has superposed fast rise time transients which may result from the operation of circuit switching devices or from other silicon controlled rectifiers operating in adjacent circuits. The other dv/dt withstand capability is the allowable rate of reapplication of forward blocking voltage following turn off of a silicon controlled rectifier. The latter is the more important of the two and the present application relates to a novel circuit for maintaining the rate of reapplication of forward blocking voltage well below the maximum allowable rate.

The invention contemplates a circuit for controlling the rate of change (dv/dt) of forward blocking voltage reapplied across a silicon controlled rectifier to prevent the silicon controlled rectifier from conducting after the silicon controlled rectifier is turned off, comprising an inductance-capacitance network connected to the silicon controlled rectifier for controlling rate of change (dv/dt) of voltage reapplied across the silicon controlled rectifier. The inductance-capacitance network has a time constant to insure rate of change of voltage low enough to prevent the silicon controlled rectifier from conducting. The network in one embodiment includes two LC circuits including a pair of capacitors connected in parallel. At least one of the capacitors is connected in parallel with the silicon controlled rectifier and one of the capacitors discharges and the other charges after the silicon controlled rectifier is turned off.

One object of the invention is to provide a novel circuit for controlling the rate of rise of forward blocking voltage reapplied to a silicon controlled rectifier following turn off.

Another object is to provide an LC circuit with a time constant which maintains the rate of rise of reapplied forward blocking voltage well below the maximum allowable rate.

These and other objects and advantages of the invention will appear more fully hereinafter from a consideration of the detailed description which follows, taken together with the accompanying drawing wherein one embodiment of the invention is illustrated by way of example. It is to be understood, however, that the drawing is for the purpose of illustration only and is not a definition of the limits of the invention, reference being had to the appended claims for this purpose.

In the drawing the single FIGURE shows a circuit diagram of a direct current to alternating current inverter embodying the invention.

Referring to the drawing, the inverter shown therein for converting direct current to alternating current is generally along the lines of the inverter shown and described in co-pending U.S. application Ser. No. 205,538, filed Dec. 7, 1971 now U.S. Pat. No. 3,775,662 issued Nov. 27, 1973 and assigned to the same assignee as the present application. The inverter shown in the drawing, in addition, includes LC networks having time constants of a value to control the rate of rise of forward blocking voltage reapplied to the silicon controlled rectifiers well within the maximum allowable rate to prevent the silicon controlled rectifiers from conducting after turn off.

In the drawing, connected between input leads 3 and 5 are three substantially identical circuits A, B and C. In circuit A, a silicon controlled rectifier 7, a diode 9 and series connected capacitor 13 and diode 15 are connected in parallel between positive input lead 3 and a lead 11. Similarly, a silicon controlled rectifier 17, a diode 19 and series connected capacitor 23 and diode 25 are connected in parallel between negative input lead 5 and a lead 21. Series connected inductors 27 and 29 are connected in parallel with a diode 30 between leads 11 and 21. The primary winding 31 of an output transformer is connected between inductors 27 and 29.

As indicated above, circuits B and C are substantially identical to circuit A and the same numerals are applied to corresponding elements of circuits B and C with subscripts $b$ and $c$, respectively. The primary windings 31, 31$b$ and 31$c$ of the transformers are connected in wye configuration although they may be connected in delta configuration as well as explained in the above application.

A commutating circuit for turning off the silicon controlled rectifiers has a series connected capacitor 33 and an inductor 35 connected through a silicon controlled rectifier 37 to a separate direct current commutating voltage source. Positive input lead 3 is connected through a silicon controlled rectifier 39 between capacitor 33 and inductor 35. An inductor 41 is connected to silicon controlled rectifier 37 and capacitor 33 and to a lead 43. A lead 45 is connected to lead 3 at the junction of capacitor 33, inductor 35 and silicon controlled rectifier 39. A silicon controlled rectifier 47 is connected between leads 43 and 11 and a silicon controlled rectifier 49 is connected between leads 21 and 45. Similarly, a silicon controlled rectifier 47$b$ is connected between leads 43 and 11$b$ and a silicon controlled rectifier 49$b$ is connected between leads 21$b$ and 45. Also, a silicon controlled rectifier 47$c$ is connected between leads 43 and 11$c$ and a silicon controlled rectifier 49$c$ is connected between leads 21$c$ and 45.

OPERATION

Every 60° a silicon controlled rectifier 7, 17$c$, 7$b$, 17, 7$c$, 17$b$ in the bridge is turned on. The silicon controlled rectifiers are turned on by applying logic signals to their gates for 150°. The silicon controlled rectifiers are turned off after approximately 180° by discharging capacitor 33 and applying a reverse polarity voltage to the silicon controlled rectifiers. The actual commutation is accomplished by causing current flow through the associated diode greater than the load current for more than 25 microseconds so that approximately a one volt drop appears across the silicon controlled rectifier with the cathode positive relative to the anode. The silicon controlled rectifier turns off and stays off until it is again commanded on by a logic signal at its gate.

The diodes are connected in anti-parallel fashion with the associated silicon controlled rectifiers in the bridge and conduct reactive current to the primary windings of the transformers after the silicon controlled rectifiers are turned off. The diodes in parallel with the silicon controlled rectifiers also prevent excessive reverse voltage from appearing across the silicon controlled rectifiers.

Capacitor 33 is charged when silicon controlled rectifier 37 is turned on by applying a logic signal to its gate. Current flows from the positive terminal of the commutating source through silicon controlled rectifier 37, capacitor 33 and inductor 35 to the negative terminal. Capacitor 33 and inductor 35 make up a resonant circuit and the voltage across capacitor 33 is greater than the voltage across the power source.

To turn off silicon controlled rectifier 7, 7b or 7c logic signals are applied to the gate of silicon controlled rectifier 47, 47b or 47c, respectively, and to the gate of silicon controlled rectifier 39 to turn them on. Capacitor 33 then discharges through inductor 41, lead 43, silicon controlled rectifier 47, 47b, or 47c, and diode 9, 9b or 9c, respectively, lead 3 and silicon controlled rectifier 39.

To turn off complement silicon controlled rectifier 17, 17b or 17c logic signals are applied to the gate of silicon controlled rectifier 49, 49b or 49c, respectively, and to the gate of silicon controlled rectifier 51 to turn them on. Capacitor 33 then discharges through inductor 41, lead 43, silicon controlled rectifier 51, lead 5, diode 19, 19b, or 19c, silicon controlled rectifier 49, 49b or 49c, respectively, and lead 45.

The novel circuit constructed according to the invention prevents voltages reapplied to a silicon controlled rectifier from rising rapidly enough to switch on the silicon controlled rectifier after it has been turned off. Assuming that silicon controlled rectifiers 7 and 17b are conducting and silicon controlled rectifiers 47 and 39 are turned on to discharge capacitor 33 and turn off silicon controlled rectifier 7 as described above, the current flowing through silicon controlled rectifier 47 is a half sine wave and, as the current increases, it flows into the transformer primary winding 31. Current in silicon controlled rectifier 7 decreases at the same rate as current in silicon controlled rectifier 47 increases. When the current in silicon controlled rectifier 47 is greater than the load current in silicon controlled rectifier 7, excess current flows through the associated diode 9 and turns off silicon controlled rectifier 7. As the commutation pulse from capacitor 33 decreases, current from capacitor 33 is no longer sufficient to maintain the load requirements and diode 9 is back biased. Silicon controlled rectifier 7 and diode 9 no longer conduct. Since transformer primary winding 31 is inductive, the potential on the cathode of silicon controlled rectifier 7 decreases toward the negative bus potential of input lead 5. The rate of change of this potential is critical to operation of the circuit and must be small enough to prevent silicon controlled rectifier 7 from turning on.

The rate of change of voltage is controlled by capacitors 13 and 23 and diodes 15, 25 and 30 in cooperation with inductors 27 and 29. Initially, capacitor 13 is discharged and capacitor 23 is charged to the bus potential. When capacitor 33 can no longer supply load current as described above, capacitor 13 charges and capacitor 23 discharges in resonance with inductors 27 and 29 through primary winding 31. The two capacitors 13 and 23 operate as if connected in parallel at this time. Capacitor 13 charges from the positive terminal of the direct current power source through input lead 3, diode 15, lead 11, inductor 27, primary windings 31 and 31b, inductor 29b, lead 21b, silicon controlled rectifier 17b and negative input lead 5 to the negative terminal of the power source. Capacitor 23 discharges through diode 30, diode 15, lead 11, inductor 27, primary winding 31, primary winding 31b, inductor 29b, lead 21b, silicon controlled rectifier 17b and negative input lead 5 to capacitor 23. Capacitors 13 and 23 are selected to have enough capacitance to supply the load current under the worst conditions and inductors 27 and 29 are chosen so the LC network has a time constant to insure a rate of change of voltage low enough to prevent silicon controlled rectifier 7 from conducting. The energy stored in inductors 27 and 29 as a result of capacitor currents is discharged through diodes 25, 30 and 15.

Complement silicon controlled rectifier 17 is turned off as described above and the rate of change of potential reapplied to the silicon controlled rectifier is controlled in substantially the same manner as described above in connection with silicon controlled rectifier 7 except that when silicon controlled rectifier 17 is conducting capacitor 13 is initially charged and capacitor 23 is initially discharged. Assuming that silicon controlled rectifiers 17 and 7b are conducting and silicon controlled rectifiers 39 and 49 are turned on to discharge capacitor 33 and turn off silicon controlled rectifier 17, when capacitor 33 can no longer supply load current capacitor 23 charges and capacitor 13 discharges in resonance with inductors 27 and 29 through primary winding 31. Capacitor 23 charges from the positive terminal of direct current power source through input lead 3, silicon controlled rectifier 7b, lead 11b, inductor 27b, primary windings 31b and 31, inductor 29, lead 21, diode 25 through capacitor 23 and negative input lead 5 to the negative terminal of the direct current power source. Capacitor 13 discharges through lead 3, silicon controlled rectifier 7b, lead 11b, inductor 27b, primary windings 31b and 31, inductor 29, lead 21 and diodes 25 and 30.

When silicon controlled rectifier 7b and its complement 17b are turned off, the rate of change of reapplied potential across the silicon controlled rectifiers is controlled by capacitors 13b and 23b, diodes 15b, 25b and 30b and inductors 27b and 29b in the manner described in connection with silicon controlled rectifier 7 and its complement silicon controlled rectifier 17. Also when silicon controlled rectifier 7c and its complement 17c are turned off, the rate of change of reapplied potential across the silicon controlled rectifiers is controlled by capacitors 13c and 23c, diodes 15c, and 25c and 30c and inductors 27c and 29c.

The circuit described herein maintains the rate of rise of forward blocking voltage reapplied to a silicon controlled rectifier well below the maximum allowable rate to avoid turn on of the silicon controlled rectifier.

What is claimed is:

1. A circuit for controlling the rate of change (dv/dt) of forward blocking voltage reapplied across a silicon controlled rectifier to prevent the silicon controlled rectifier from conducting after the silicon controlled rectifier is turned off, comprising a resonant inductance-capacitance network including a series connected capacitor and diode connected in parallel with the silicon controlled rectifier and an inductance connected in series with the silicon controlled rectifier, the diode being poled to conduct in the same direction as the silicon controlled rectifier, the network having a time constant to insure a rate of change (dv/dt) of voltage reapplied across the silicon controlled rectifier to prevent the silicon controlled rectifier from conducting after the silicon controlled rectifier is turned off.

2. A circuit as described in claim 1 in which the inductance capacitance network includes means for discharging the energy stored in the inductance as a result of capacitor currents.

3. A circuit as described in claim 2 in which the discharging means are diodes connected in series with the inductors.

4. A circuit having a pair of silicon controlled rectifiers alternately turned on by logic signals applied to the gates of the silicon controlled rectifiers and alternately turned off by applying reverse polarity voltages across the silicon controlled rectifiers, the circuit including a resonant inductance capacitance network connnected to each silicon controlled rectifier and having a time constant to insure a rate of change (dv/dt) of forward blocking voltage reapplied across the silicon controlled rectifiers to prevent the silicon controlled rectifiers from conducting after the silicon controlled rectifiers are turned off, each said network including a series connected capacitor and diode connected in parallel with the associated silicon controlled rectifier and an inductance connected in series with the silicon controlled rectifier, the diode being poled to conduct in the same direction as the silicon controlled rectifier.

5. A circuit as described in claim 4 in which the capacitors are alternately charged and discharged when the silicon controlled rectifiers are alternately turned off.

6. A circuit as described in claim 5 in which one capacitor charges while the other capacitor discharges.

7. A circuit as described in claim 4 in which the inductance capacitance network includes means for discharging the energy stored in the inductance as a result of capacitor currents.

8. A current as described in claim 7 in which the discharging means are diodes connected in series with the inductors.

* * * * *